(12) United States Patent
Ha et al.

(10) Patent No.: US 8,704,982 B2
(45) Date of Patent: Apr. 22, 2014

(54) ADHESIVE AGENT

(71) Applicant: LG Chem, Ltd., Seoul (KR)

(72) Inventors: Jeong Min Ha, Daejeon (KR); No Ma Kim, Daejeon (KR); In Ho Hwang, Daejeon (KR); Sung Soo Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/916,347

(22) Filed: Jun. 12, 2013

(65) Prior Publication Data

US 2013/0342792 A1     Dec. 26, 2013

Related U.S. Application Data

(63) Continuation of application No. 13/059,923, filed as application No. PCT/KR2009/004652 on Aug. 20, 2009, now Pat. No. 8,570,470.

(30) Foreign Application Priority Data

Aug. 20, 2008   (KR) .................. 10-2008-0081317

(51) Int. Cl.
  *G02F 1/1333*   (2006.01)
  *G02F 1/1335*   (2006.01)
(52) U.S. Cl.
  CPC ........ *G02F 1/1333* (2013.01); *G02F 1/133528* (2013.01)
  USPC .......................................... 349/122; 349/96
(58) Field of Classification Search
  CPC ............ G02F 1/133528; G02F 1/1333; G02F 1/1335; G02F 2202/28; G02B 5/30; G02B 1/105; C09J 2201/606; C09J 2201/128; C09J 2201/134; C09J 2201/28; C09J 2201/36; C09J 7/0246; B29K 2995/0034; B32B 2457/202; B32B 2457/20; B32B 2307/42; B32B 7/12; B29D 11/00644; C08G 2170/40
  USPC ............ 349/96, 194, 122; 428/343, 1.1, 214, 428/355 R; 156/275.7; 427/163.1, 208.4
  See application file for complete search history.

(56) References Cited

U.S. PATENT DOCUMENTS

| | | | |
|---|---|---|---|
| 6,074,729 A * | 6/2000 | Watanabe et al. | ............. 428/212 |
| 6,744,132 B2 | 6/2004 | Alcoe et al. | |
| 6,887,917 B2 | 5/2005 | Yang et al. | |
| 8,148,442 B2 | 4/2012 | Nagamoto et al. | |

FOREIGN PATENT DOCUMENTS

| | | |
|---|---|---|
| CN | 101018839 | 8/2007 |
| JP | 02-075679 | 3/1990 |
| JP | 08-157781 | 6/1996 |
| TW | 1274780 | 3/2007 |
| TW | 2008-29961 | 7/2008 |

* cited by examiner

*Primary Examiner* — Thoi Duong
(74) *Attorney, Agent, or Firm* — McKenna Long & Aldridge, LLP

(57) ABSTRACT

Provided are a pressure-sensitive adhesive having excellent durability and reliability under high-temperature or high-humidity conditions, adhesion strength, workability, re-movability, and the ability to inhibit light leakage; a method for preparing the pressure-sensitive adhesive; a polarizer including the pressure-sensitive adhesive; and a liquid crystal display incorporating the polarizer.

14 Claims, 5 Drawing Sheets

ADHESIVE AGENT

CROSS-REFERENCE TO RELATED APPLICATION

This application is a Continuation of U.S. patent application Ser. No. 13/059,923 filed Feb. 18, 2011, which is the U.S. National Phase application of International Application No. PCT/KR2009/004652 filed on Aug. 20, 2009, which claims the benefit of Korean patent Application No. 10-2008-0081317, filed Aug. 20, 2008, in the Korean Intellectual Property Office, the disclosure of which is incorporated herein in their entirety by reference for all purposes as if fully set forth herein.

BACKGROUND

1. Field of the Invention

The present invention relates to a pressure-sensitive adhesive, a method for preparing the pressure-sensitive adhesive, a polarizer, and a liquid crystal display.

2. Discussion of Related Art

A polarizer is an optical member included in a liquid crystal display (LCD). A polarizer has a multilayer structure that includes iodine compounds or dichromatic polarizing materials arranged in a predetermined direction; and protecting films (e.g. triacetyl cellulose (TAC)) for protecting a polarizing film or element. Further, the polarizer may include additional films, such as a phase difference plate, a wide viewing angle compensating plate, a brightness improving film and the like, to improve its performance.

Each film constituting a multilayer polarizer is made of materials having different molecular structures and compositions, and thus shows different physical properties. Particularly, these films lack dimensional stability under high temperature and/or high humidity conditions due to a difference in the shrinkage or expansion behavior thereof. As such, when a polarizer is fixed by a pressure-sensitive adhesive, the TAC layer, and any other layer, is subject to stress concentration at high temperature and/or high humidity. As a result, birefringence is induced, and light leakage takes place.

To solve these problems, techniques for providing the adhesive with a stress relaxation characteristic have been disclosed. Particularly, a method of designing the adhesive so as to cause high creep and easy deformation under external stress has been disclosed (e.g. Korean Patent Application Publication No. 1998-079266, Japanese Patent Application Publication No. 2002-047468, etc.).

However, this technique has a drawback in that cuttability or workability of the adhesive is significantly reduced. When the cuttability or workability of the adhesive is reduced, failure such as leakage or depression of the adhesive occurs when the polarizer is mass-produced, and thus the yield is remarkably lowered.

On the other hand, there have been attempts to design an adhesive with high hardness to minimize the light leakage.

For example, Japanese Patent Application Publication No. 2007-197659 discloses a technique in which an adhesive composition is prepared by adding a multi-functional acrylate, an isocyanate hardener, and a photo initiator to an acrylic copolymer containing a carboxyl group, and then an adhesive is prepared by UV curing the adhesive composition. Japanese Patent Application Publication No. 2007-212995 discloses a technique in which an adhesive composition is prepared by mixing a copolymer containing a hydroxyl group and a copolymer containing a carboxyl group at a predetermined ratio and adding a multi-functional acrylate, a multi-functional isocyanate hardener, and a photo initiator to the mixture, and then an adhesive is prepared by UV curing the adhesive composition.

However, the storage modulus (G') of the adhesives disclosed in the prior art documents, is excessively increased, and thus initial adhesion is greatly reduced. Thus, durability is reduced at high temperature or humidity. Further, when the storage modulus of the adhesive is controlled to be low, the hardness of the adhesive becomes insufficient, and thus a large quantity of light leaks out.

SUMMARY OF THE INVENTION

The present invention provides a pressure-sensitive adhesive, a method of producing the pressure-sensitive adhesive, a polarizer that includes the pressure-sensitive adhesive, and a liquid crystal display incorporating the polarizer.

An aspect of the present invention provides a pressure-sensitive adhesive including a hard area and a soft area, whereby the soft area has a lower storage modulus than the hard area. The hard area and the soft area are patterned within a single plane.

Another aspect of the present invention provides a method of producing a pressure-sensitive adhesive. The method includes a first step of coating a coating solution (e.g. a pressure-sensitive adhesive composition) for forming the pressure-sensitive adhesive on a substrate, and a second step of curing the pressure-sensitive adhesive composition coated on the substrate in the first step so as to form a pattern of hard areas and soft areas.

Still another aspect of the present invention provides a polarizer including a pressure-sensitive adhesive, in which the pressure-sensitive adhesive is formed on one or both surfaces of a polarizing film or a polarizing element.

Yet another aspect of the present invention provides a liquid crystal display including a liquid crystal panel, in which a polarizer is attached to one or both surfaces of the liquid crystal panel.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

Figure 1:
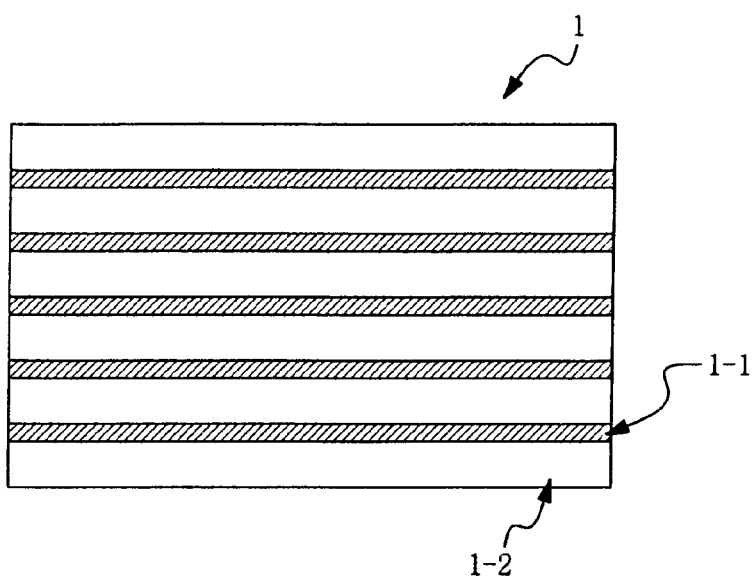
FIG. 1 is a schematic plan view illustrating a pressure-sensitive adhesive according to an exemplary embodiment of the present invention.

The present invention relates to a pressure-sensitive adhesive including a hard area and a soft area, whereby the soft area has a lower storage modulus than the hard area, the hard area and soft area being patterned within a single plane.

Hereinafter, the pressure-sensitive adhesive of the present invention will be described in greater detail.

The pressure-sensitive adhesive of the present invention is designed to include hard and soft areas within a single plane in a patterned state. The term "single plane" as used herein refers to a continuous plane formed by a single pressure-sensitive adhesive. Thus, the term "a pattern of hard and soft areas formed within a single plane" refers to the case in which at least two areas, one area having a higher storage modulus than the other area, are patterned in a single pressure-sensitive adhesive plane. For this reason, the case in which the pattern of hard and soft areas is formed by combining at least two pressure-sensitive adhesives having a uniform storage modulus is excluded from the definition "pattern of hard and soft areas formed within a single plane" of the present invention. As mentioned above, when the pattern is formed using at least two pressure-sensitive adhesives, the productivity of optical members such as a polarizer is remarkably reduced, and an effect similar to a single plane cannot be produced due to different physical properties between the pressure-sensitive adhesives forming the pattern. For example, when the pressure-sensitive adhesive is applied to an optical member such as a polarizer, the contacts (interfacial parts) of the at least two pressure-sensitive adhesives are susceptible to failure, and problems with durability easily arise because the pressure-sensitive adhesives have different shrinkage rates and storage moduli. Further, when the at least two pressure-sensitive adhesives are used, their contacts (interfacial parts) have high non-uniformity, and thus easily give rise to problems in the aspect of light transmission uniformity.

The term "hard area" as used herein refers to an area having a higher storage modulus in the pressure-sensitive adhesive compared to another area (e.g. a soft area). In the present invention, for example, the hard area may have a storage modulus of 1 MPa to 50 MPa, preferably 1 MPa to 40 MPa, and more preferably 1 MPa to 20 MPa at a temperature of 30° C. By setting the storage modulus of the hard area in this range, it is possible to prevent adhesion or durability from being lowered while a dimensional change caused by elongation of the polarizer is inhibited.

Further, the term "soft area" as used herein refers to an area having a lower storage modulus in the pressure-sensitive adhesive compared to another area (e.g. a hard area). For example, the soft area may have a storage modulus of 0.01 MPa to 5.0 MPa, preferably 0.01 MPa to 0.1 MPa, and more preferably 0.1 MPa to 1 MPa at a temperature of 30° C. In the present invention, by setting the storage modulus of the soft area in this range, it is possible for the soft area to effectively support the hard area, and thus to effectively inhibit shrinkage and expansion of the polarizer while the workability of the pressure-sensitive adhesive and the yield of the polarizer are excellently maintained. Further, as the storage modulus of the soft area is set in this range, it is possible to prevent durability and adhesion properties from being reduced due to an excessive increase in the entire storage modulus of the pressure-sensitive adhesive.

Further, the term "pattern" as used herein refers to the case in which the hard and soft areas have a predetermined shape in the single pressure-sensitive adhesive plane. Here, the shape includes a linear shape, a quadrilateral shape, a circular shape or an elliptical shape, as well as an irregular shape, i.e. an amorphous shape.

In one embodiment, the hard area may be patterned in a linear shape, and preferably in a continuous linear shape. In detail, the pressure-sensitive adhesive 1 of the present invention may include the hard areas 1-1 and the soft areas 1-2 patterned in a continuous linear shape as illustrated in FIG. 1.

In the case in which the hard and soft areas of the pressure-sensitive adhesive are patterned in a linear shape, the hard areas may be continuous, as illustrated in FIG. 1. Here, the term "continuous" refers to the state where the hard areas patterned in a linear shape continue throughout the pressure-sensitive adhesive without interruption. In this case, the hard areas may be continuously formed in a direction parallel or perpendicular to an elongation axis of a polarizer to which the pressure-sensitive adhesive is applied. When exposed to high-temperature or high-humidity conditions, the polarizer contracts or expands along the elongation axis thereof, over an entire surface thereof. Thus, when the hard areas of the pressure-sensitive adhesive are configured to be continuous, light leakage caused by the shrinkage or expansion of the polarizer under the conditions can be effectively inhibited.

When the hard areas have a linear pattern as mentioned above, the width and interval of the linear pattern are not particularly limited, and can be controlled according to the desired purpose. In the present invention, for example, in consideration of productivity, etc., the hard areas having a linear pattern may be configured to have a width of 90 µm to 1,000 µm, and an interval of 50 µm to 1.0 cm. Further, in the present invention, the width and interval of the linear pattern of hard areas may be controlled to be equal to each other or different from each other as needed. However, the line width and interval of the linear pattern of the hard areas are not limited to this configuration.

In the present invention, the ratio ($G'_{hard}/G'_{soft}$) of the storage modulus ($G'_{hard}$) of the hard area to that ($G'_{soft}$) of the soft area may range from 3 to 100, preferably from 3 to 50, and more preferably from 3 to 30. In the present invention, when the ratio is less than 3, an effect obtained by patterning the pressure-sensitive adhesive with different storage moduli may become insignificant. When the ratio is more than 100, the difference between the storage moduli of the hard and soft areas is too excessively, and thus the physical properties of the pressure-sensitive adhesive become non-uniform, durability is reduced, or haze may occur due to a difference in refractive index.

Further, in the present invention, the hard area may have an area ratio of 10% to 60%, and preferably 15% to 50%, relative to the entire area of the pressure-sensitive adhesive. Here, the term "entire area of the pressure-sensitive adhesive" refers to an entire area of a single plane formed by the single pressure-sensitive adhesive. In the present invention, when the hard area occupies less than 10% of the entire area, an overall hardness of the pressure-sensitive adhesive may be too low, workability, cuttability, and productivity may be degraded, or strain derived from the elongation axis of the polarizer may not be effectively inhibited, so light leakage may occur. Further, when the hard area occupies more than 60% of the entire area, the hardness of the pressure-sensitive adhesive may be too high, and thus the adhesion and durability may be reduced.

In the present invention, the pressure-sensitive adhesive including the pattern of hard and soft areas as described above may have a gel content expressed by the following Equation 1 within a range of 50% to 99%, preferably 80% to 99%, and more preferably 90% to 99%.

$$\text{Gel Content} = B/A \times 100 \quad \text{[Equation 1]}$$

where A represents the weight of the pressure-sensitive adhesive, and B represents the weight of the dried product of the undissolved parts of the pressure-sensitive adhesive, the weight of the dried product being measure after depositing the pressure-sensitive adhesive in ethyl acetate for 72 hours at room temperature, and drying the deposits.

The term "the weight of the dried product" as used herein refers to the weight of the undissolved components of the deposits, from which ethyl acetate is removed by drying the deposits under suitable conditions after the deposition process. Here, the conditions for removing the ethyl acetate are not particularly limited, as long as the ethyl acetate included in the deposits can be completely removed.

In the present invention, when the gel content is less than 50%, bubbles occur under high-temperature or high-humidity conditions, and thus the durability and reliability may be reduced. When the gel content is more than 99%, peeling or lifting may occur under high-temperature or high-humidity conditions.

In the present invention, as described above, the components constituting the pressure-sensitive adhesive in which the hard and soft areas are included in a patterned state are not particularly limited. In the present invention, for example, the pressure-sensitive adhesive may be prepared by curing a pressure-sensitive adhesive composition containing an acryl resin, a multi-functional acrylate, and a photo initiator.

In the present invention, the pressure-sensitive adhesive composition may be a photo-curable composition. Here, a photo-curable composition refers to a composition that can be cured by irradiating radiation. Meanwhile, the term "radiation" as used herein refers to energy rays capable of causing a curing reaction by influencing a polymerizable group or a polymerization initiator included in the pressure-sensitive adhesive composition, and includes electromagnetic rays and ultraviolet (UV) rays. Hereinafter, the term "UV rays" may be regarded as having the same meaning as "radiation."

In the present invention, the composition of the acryl resin as mentioned above is not particularly limited. For example, in the present invention, the acryl resin may include a polymer of a (meth)acrylic acid ester monomer or a polymer of a monomer mixture comprising a (meth)acrylic acid ester monomer.

The kind of (meth)acrylic acid ester monomer that can be used in the present invention is not particularly limited. For example, alkyl(meth)acrylate may be used. In this case, when an alkyl group included in the (meth)acrylic acid ester monomer is excessively long, the cohesion of the pressure-sensitive adhesive may be reduced, or adjustment of the glass transition temperature $T_g$, or adhesion properties may be difficult. As such, it is preferable to use an alkyl(meth)acrylate having an alkyl group with 1 to 14 carbon atoms. Examples of this monomer may include methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl(meth)acrylate, isooctyl(meth)acrylate, isononyl(meth)acrylate, lauryl(meth)acrylate, and tetradecyl(meth)acrylate. In the present invention, one or a mixture of at least two selected from these monomers may be used.

In the present invention, the acryl resin may be provided with a crosslinkable functional group as needed. In this case, the monomer mixture constituting the polymer may include a (meth)acrylic acid ester monomer and a crosslinkable monomer. This crosslinkable monomer may react with a multi-functional crosslinking agent or a silane coupling agent, which will be described below, thereby functioning to improve physical properties such as durability and cohesion under high-temperature or high-humidity conditions.

Examples of the crosslinkable monomer that can be used in the present invention include a monomer containing a hydroxy group, a monomer containing a carboxyl group, and a monomer containing nitrogen At least one of these monomers may be properly selected and used in consideration of the kind of the crosslinking agent included in the pressure-sensitive adhesive composition. The present invention, above all, preferably uses, but is not limited to, a monomer containing a hydroxy group among the crosslinkable monomers.

Detailed examples of a monomer containing a hydroxy group include 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate, 2-hydroxypropyleneglycol(meth)acrylate, and so on. Examples of a monomer containing a carboxyl group include (meth)acrylic acid, 2-(meth)acryloyloxy acetate, 3-(meth)acryloyloxy propylate, 4-(meth)acryloyloxy butyrate, acrylic acid dimer, itaconic acid, maleic acid, maleic acid anhydride, and so on. Examples of a monomer containing nitrogen include (meth)acrylamide, N-vinyl pyrrolidone, N-vinyl caprolactam, and so on. The crosslinkable monomer is not limited to these monomers. In the present invention, one or a mixture of at least two selected from these monomers may be used.

When the monomer mixture in the present invention includes the crosslinkable monomer, the monomer mixture may, for example, include 80 to 99.8 parts by weight of the (meth)acrylic acid ester monomer, and 0.01 to 3 parts by weight of the crosslinkable monomer.

In the case where the monomer mixture includes the crosslinkable monomer, the initial adhesion strength of the pressure-sensitive adhesive may be reduced when the (meth)acrylic acid ester monomer is less than 80 parts by weight. When the (meth)acrylic acid ester monomer is more than 99.8 parts by weight, the cohesion may be reduced, so there is a possibility there will be a problem with the durability.

Further, when the crosslinkable monomer of the monomer mixture is less than 0.01 parts by weight, the durability and reliability of the pressure-sensitive adhesive may be reduced. When the crosslinkable monomer of the monomer mixture is more than 3 parts by weight, the reaction with the crosslinking agent and/or the silane coupling agent may be excessively carried out, so that the tackiness and/or peel strength may be reduced.

Further, in the present invention, a compound expressed by the following Formula 1 may be additionally copolymerized in the acryl resin as needed. The compound of Formula 1 may be added to adjust the glass transition temperature and provide other functions.

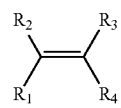

[Formula 1]

where each of $R_1$, $R_2$ and $R_3$ independently represents hydrogen or alkyl, and R4 represents phenyl, acetyloxy or $COR_5$ substituted or unsubstituted with cyano or alkyl. Here, $R_5$ represents glycidylalkyloxy, glycidyloxy or amino substituted or unsubstituted with alkyl or alkoxyalkyl.

In the definitions of $R_1$ to $R_5$ of Formula 1, alkyl or alkoxy refers to alkyl or alkoxy having 1 to 8 carbon atoms, and preferably methyl, ethyl, methoxy, ethoxy, propoxy or butoxy.

Detailed examples of the monomer of Formula 1 include, but are not limited to, one or at least two of a monomer containing nitrogen such as (meth)acrylonitrile, (meth)acrylamide, N-methyl(meth)acrylamide, or N-butoxy methyl(meth)acrylamide; a styrene monomer such as styrene or methyl styrene; glycidyl(meth)acrylate; and a carboxylic acid vinyl ester such as vinyl acetate. In the case in which the monomer mixture of the present invention includes the compound of Formula 1, it is preferable to have an amount of 20 parts by weight or less on the basis of the content of (meth) acrylate ester monomer. When the content of the compound is more than 20 parts by weight, the softness and/or peel strength of the pressure-sensitive adhesive may be reduced.

When the acryl resin is a polymer of a (meth)acrylate ester monomer and/or the functional monomer represented by Formula 1, the polymer preferably has a weight-average molecular weight of 500,000 or more. In the acryl resin having the above-mentioned composition, when the weight-average molecular weight is less than 500,000, bubbles appear or peeling occurs under high-temperature or high-humidity conditions due to a decrease in cohesion, and thus the durability and reliability may be reduced.

When the acryl resin in the present invention includes the crosslinkable monomer as a monomer component, the acryl resin preferably has a weight-average molecular weight of 1,000,000 or more. When the weight-average molecular weight of the acryl resin is less than 1,000,000, the durability and reliability of the pressure-sensitive adhesive may be reduced.

In the present invention, the upper limit of the weight-average molecular weight of the acryl resin is not particularly limited. For example, the weight-average molecular weight of the acryl resin may be appropriately controlled within a range of 2,500,000 or less in consideration of the durability and reliability or coatability of the pressure-sensitive adhesive, but it is not limited to this range.

In the present invention, a method of preparing the acryl resin including the components is not particularly limited. For example, the acryl resin may be prepared using an ordinary polymerization method such as solution polymerization, photo polymerization, bulk polymerization, suspension polymerization, or emulsion polymerization. The acryl resin may be preferably prepared by using solution polymerization. The solution polymerization may be carried out at a temperature of 50° C. to 140° C. by adding an initiator when each monomer is mixed uniformly. Examples of the initiator that may be used in this process include an azo initiator, such as azobisisobutyronitrile or azobiscyclohexane carbonitrile, and/or a typical initiator, such as a benzoil peroxide or acetyl peroxide. The initiator may use, but is not limited to, one or a mixture of at least two selected from the initiators.

In the present invention, the pressure-sensitive adhesive composition may include a multi-functional acrylate in addition to the acryl resin. The multi-functional acrylate, for example, may serve to enhance the storage modulus of the pressure-sensitive adhesive through reaction with a photo initiator, which will be described below.

The kind of multi-functional acrylate that may be used in the present invention is not particularly limited. In the present invention, the multi-functional acrylate may be, but is not limited to, a bifunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylation cyclohexyl di(meth)acrylate, tricyclodecandimethanol (meth)acrylate, dimethylol dicyclopentane di(meth)acrylate, ethyleneoxide-modified hexahydrophthalate di(meth)acrylate, tricyclodecane dimethanol(meth)acrylate, neopentylglycol-modified trimethylpropane di(meth)acrylate, adamantine di(meth)acrylate, or 9,9-bis[4-(2-acryloyloxyethoxy)phenyl]fluorine; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane(meth)acrylate, or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; and a hexafunctional acrylate such as dipentaerythritol hexa(meth)acrylate, caprolactone-modified dipentaerythritol hexa(meth)acrylate, or urethane(meth)acrylate (e.g. a reaction product of isocyanate monomer and trimethylolpropane tri(meth)acrylate) (e.g. UA-306I, UA-306T, etc. available from Kyoeisha Chemical Co. Ltd., Japan).

In the present invention, one or a mixture of at least two selected from these multi-function acrylates may be used. Particularly, an acrylate having a molecular weight of less than 1,000 and two functionalities, and preferably at least three functionalities, is used, so that superior durability can be realized. The scope of the present invention is not limited to this configuration.

Further, in one embodiment, a multi-functional acrylate having a ring structure in its molecular structure may be used. When this kind of acrylate is used, the pressure-sensitive adhesive may be formed in a harder state, and thus improve the inhibition of light leakage. In this case, the ring structure included in the acrylate may include any one of an carbocyclic or heterocyclic structure, and a monocyclic or polycyclic structure. Detailed examples of the multi-functional acrylate including the ring structure include, but are not limited to, a compound having an isocyanurate structure such as tris(meta)acryloxyethyl isocyanurate, and the like; a hexafunctional acrylate such as an isocyanate-modified urethane (meth)acrylate (e.g. a reaction product of an isocyanate compound and trimethylolpropane tri(meth)acrylate), or the like.

In the pressure-sensitive adhesive composition of the present invention, the multi-functional acrylate may be included in an amount of 5 to 40 parts by weight relative to 100 parts by weight of acryl resin. When the content of the multi-functional acrylate is less than 5 parts by weight, the durability may be reduced under high-temperature conditions, and the ability to inhibit light leakage may be reduced. When the content of the multi-functional acrylate is more than 40 parts by weight, durability at high-temperatures may be reduced.

In the present invention, the composition constituting the pressure-sensitive adhesive may further include a photo initiator.

The kind of photo initiator that may be used in the present invention is not particularly limited as long as it can induce a curing reaction of the pressure-sensitive adhesive composition by being irradiated with, for instance, UV rays. Examples of the photo initiator include benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-on, 1-hydroxycyclohexylphenylketone, 2-methyl-1-[4-(methylthio)phenyl]-2-morpholino-propane-1-on, 4-(2-hydroxyethoxy)phenyl-2-(hydroxy-2-propyl)ketone, benzophenone, p-phenylbenzophenone, 4,4'-diethylaminobenzophenone, dicyclobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone], and 2,4,6-trimethyl benzoyl-diphenyl-phosphinoxide, and so on. In the present invention, the photo initiator may be, but is not limited to, one or a mixture of at least two selected from the photo initiators.

In the pressure-sensitive adhesive composition of the present invention, the photo initiator may be included in an amount of 0.01 to 5 parts by weight relative to 100 parts by weight of acryl resin, or in an amount of 0.2 to 20 parts by weight relative to 100 parts by weight of multifunctional acrylate. By controlling the content of the photo initiator within this range, the curable reaction of the composition may be smoothly carried out, and it is possible to prevent the physical properties of the pressure-sensitive adhesive from being degraded due to residual components after reaction.

In the present invention, the pressure-sensitive adhesive composition may further include a multi-functional crosslinking agent as needed. When this multi-functional crosslinking agent is additionally included, the pressure-sensitive adhesive may have an interpenetrating polymer network (IPN). The term "IPN structure" as used herein refers to the state in which at least two crosslinking structures co-exist in a curing system of the pressure-sensitive adhesive. For example, when an acryl resin including a crosslinkable functional group is used in the present invention, and the multi-functional crosslinking agent is further included, a crosslinking structure (hereinafter, referred to as "first crosslinked structure") formed by the reaction of the acryl resin and the crosslinking agent, and another crosslinking structure (hereinafter, referred to as "second crosslinked structure") formed by the multi-functional acrylate and the photo initiator may coexist in the adhesive, and thus the IPN structure may be realized. In this manner, the IPN structure is realized in the pressure-sensitive adhesive, and the balance of the overall physical properties required for the pressure-sensitive adhesive to be used with optical members, such as the characteristic of inhibiting light leakage and the durability and reliability, remain excellent.

The kind of crosslinking agent that may be used in the present invention is not particularly limited. For example, ordinary crosslinking agents such as an isocyanate compound, an epoxy compound, an aziridine compound, and a metal chelate compound may be used. It is somewhat preferable to use, but is not limited to, an isocyanate compound. In other words, in the present invention, it is possible to select and use an ordinary crosslinking agent known in the art without limitation according to the kind of crosslinkable functional group included in the acryl resin, and so on. Detailed examples of the isocyanate compound include, but are not limited to, at least one selected from the group consisting of toluene diisocyanate, xylene diisocyanate, diphenylmethane diisocyanate, hexamethylene diisocyanate, isophorone diisocyanate, tetramethylxylene diisocyanate, naphthalene diisocyanate, and a reaction product of one of at least one of these isocyanates and polyol (e.g. trimethylol propane). Detailed examples of the epoxy compound include, but are not limited to, at least one selected from the group consisting of ethyleneglycol diglycidylether, triglycidylether, trimethylolpropane triglycidylether, N,N,N',N'-tetraglycidyl ethylenediamine, and glycerin diglycidylether. Detailed examples of the aziridine compound include, but are not limited to, at least one selected from the group consisting of N,N'-toluene-2,4-bis(1-aziridinecarboxide), N,N'-diphenylmethane-4,4'-bis(1-aziridinecarboxide), triethylene melamine, bisisoprothaloyl-1-(2-methylaziridine), and tri-1-aziridinylphosphinoxide. Further, detailed examples of the metal chelate compound include, but are not limited to, a compound in which a polyvalent metal, such as aluminum, iron, zinc, tin, titanium, antimony, magnesium, and/or vanadium, is coordinated to acetyl acetone or ethyl acetoacetate.

In the pressure-sensitive adhesive composition, the crosslinking agent may be included in an amount of 0.01 to 10 parts by weight, and preferably 0.01 to 5 parts by weight, relative to 100 parts by weight of acryl resin. When the content of the crosslinking agent is less than 0.01 parts by weight, the cohesion of the pressure-sensitive adhesive may be reduced. When the content of the crosslinking agent is more than 10 parts by weight, interlayer peeling or lifting may occur, and thus the durability and reliability may be reduced.

The pressure-sensitive adhesive composition of the present invention may further include a silane coupling agent in addition to the above-mentioned components. This coupling agent serves to enhance cohesiveness and adhesive stability between the pressure-sensitive adhesive and a glass substrate, and thus improve heat resistance and moisture resistance. Further, the coupling agent serves to increase adhesive reliability when the pressure-sensitive adhesive is left alone for a long time under high-temperature and/or high-humidity conditions. Examples of the coupling agent that may be used in the present invention include γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxy silane, vinyltriethoxy silane, γ-methacryloxypropyl trimethoxy silane, γ-methacryloxypropyl triethoxy silane, γ-aminopropyl trimethoxy silane, γ-aminopropyl triethoxy silane, 3-isocyanatopropyl triethoxy silane, γ-acetoacetatepropyl trimethoxy silane, γ-acetoacetatepropyl triethoxy silane, β-cyanoacetyl trimethoxy silane, β-cyanoacetyl triethoxy silane, or acetoxyaceto trimethoxy silane, among which one or a mixture of at least two may be used. The present invention preferably uses, but is not limited to, a silane coupling agent having an acetoacetate group or a β-cyanoacetyl group. In the composition of the present invention, the silane coupling agent may be included in an amount of 0.01 to 5 parts by weight, and preferably 0.01 to 1 parts by weight, relative to 100 parts by weight of acryl resin. When the content of the coupling agent is less than 0.01 parts by weight, an effect of increasing the adhesion may be insignificant. When the content of the coupling agent is more than 5 parts by weight, the durability and reliability may be reduced.

Further, from the standpoint of the adjustment of adhesive performance, the pressure-sensitive adhesive composition of the present invention may further include 1 to 100 parts by weight of a tackifier relative to 100 parts by weight of acryl resin. The kind of tackifier is not particularly limited. For example, the tackifier may employ one or a mixture of at least two selected from a (hydrogenated) hydrocarbon resin, a (hydrogenated) rosin resin, a (hydrogenated) rosin ester resin, a (hydrogenated) terpene resin, a (hydrogenated) terpene phenol resin, a polymerized rosin resin, and a polymerized rosin ester resin. When the content of the tackifier is less than 1 part by weight, the effect of adding the tackifier may be insignificant. When the content or the tackifier is more than 100 parts by weight, the effect of increasing commercial utility and/or cohesion may be reduced.

Further, the pressure-sensitive adhesive composition of the present invention may further include at least one additive selected from the group consisting of an epoxy resin, a crosslinking agent, a UV stabilizer, an antioxidant, a coloring agent, a reinforcing agent, a filler, an anti-foaming agent, a surfactant, and a plasticizer, to the extent that it does not influence the effects of the present invention.

In the present invention, a method of preparing the pressure-sensitive adhesive using the pressure-sensitive adhesive composition including the components as mentioned above is not particularly limited.

That is, in the present invention, any method may be used as long as the pattern of hard and soft areas can be formed by altering the UV rays irradiated when the pressure-sensitive adhesive is prepared.

For example, the method of preparing the pressure-sensitive adhesive of the present invention may include a first step of coating a coating solution (e.g. a pressure-sensitive adhesive composition) for forming the pressure-sensitive adhesive on a substrate, and a second step of curing the pressure-sensitive adhesive composition coated on the substrate in the first step so as to form a pattern of hard and soft areas, whereby the soft area has a lower storage modulus than the hard area.

In the present invention, a method of preparing the coating solution used in the first step is not particularly limited. For example, the coating solution may be prepared by appropriately mixing the above-mentioned components, or by diluting the above-mentioned components with an appropriate solvent in consideration of coatability.

Further, in the first step of the present invention, the kind of substrate on which the coating solution is coated is not particularly limited. For example, when the pressure-sensitive adhesive of the present invention is to be formed on a polarizer, the coating solution may be directly coated on the polarizer (e.g. a polarizing film, a polarizing element or a protecting film), or to a releasable substrate according to the circumstances. In the present invention, when the coating solution is coated on a releasable substrate, a patterned adhesive may be formed through a curing process described below, and then a process of transferring the pressure-sensitive adhesive formed in this way to the polarizer may be additionally carried out.

Meanwhile, in the first step of the present invention, the method of coating the coating solution on the substrate as mentioned above is not particularly limited, and may be carried out using a typical means such as a bar coater.

Further, during the coating process of the first step, from the viewpoint of carrying out uniform coating, it is preferable to control the functional group of the multi-functional crosslinking agent included in the pressure-sensitive adhesive composition or the coating solution so as not to give rise to a crosslinking reaction. Thereby, the multi-functional crosslinking agent may form a crosslinking structure while being cured and aged after the coating, and thus improve the cohesion of the pressure-sensitive adhesive, as well as adhesive physical properties and cuttability.

Further, before the coating solution coated in the first step of the present invention is applied to the curing process described below, it is preferable to sufficiently remove foam-producing components such as volatile components or reaction residues included in the pressure-sensitive adhesive composition or the coating solution. This process can prevent the storage modulus from being lowered because of excessively low crosslinking density or molecular weight of the pressure-sensitive adhesive after curing, and prevent a scatter from being formed inside because of an increase in the size of foams existing between the glass substrate and the pressure-sensitive adhesive layer under high temperature.

The second step of the present invention is a process of curing the coating solution coated on the substrate in the first step so as to form the pattern of hard and soft areas. In the present invention, the method of forming the pattern of hard and soft areas is not particularly limited. For example, the pattern of hard and soft areas may be formed by controlling the degree of curing of the coating solution in consideration of the pattern to be formed. In detail, when a difference in the degree of curing of the coating solution is caused during the curing process, an area in which the curing is carried out more than another area has a higher storage modulus, which forms the hard area, whereas an area where the curing is carried out less than another area has a lower storage modulus, which forms the soft area.

Further, the method of controlling the degree of curing of the coating solution (i.e. the pressure-sensitive adhesive composition) in the present invention is not particularly limited. For example, when a photocurable adhesive composition is used, the degree of curing can be controlled by controlling an irradiating dose and/or time of the radiation at each place of the coating solution according to the desired pattern of hard and soft areas. In detail, when the irradiating dose or time of the radiation is increased, the hardness of the pressure-sensitive adhesive may be increased to form the hard area. In contrast, when the irradiating dose or time of the UV rays is decreased, the soft area may be formed. Further, when the irradiating radiation intensity of the UV rays is zero, the hardness of the pressure-sensitive adhesive is controlled to the minimum extent.

In the present invention, the method of controlling the degree of curing based on the alteration of the irradiation of the UV rays is not particularly limited.

For example, in the present invention, the alteration of the irradiation of the UV rays may be caused through a method of performing UV spot irradiation using a laser processing apparatus or a stepper (i.e. a lithography apparatus), a method of using a UV cutoff mask, or a method of using a UV shield mask.

Among them, the UV spot irradiation method is adapted to cause a difference in the degree of curing by moving the substrate (e.g. polarizer or releasable film) on which the coating solution is formed during UV spot irradiation, or moving the spot irradiated UV rays themselves on a plane of the coating solution. In this process, the difference in the degree of curing may be induced by controlling the diameter of a spot irradiated with the UV rays, the path of the substrate or UV light source, the irradiating radiation intensity of the UV rays, or an irradiating time of the UV rays. Here, the type of UV light source that may be used is not particularly limited. For example, the UV light source may include a high-pressure mercury lamp, a low-pressure mercury lamp, a hydrogen (heavy hydrogen) lamp, an inert gas discharge lamp (e.g. of xenon, argon, helium or neon), a nitrogen laser, an excimer laser (e.g. of XeCl, XeF, KrF, or KrCl), a hydrogen laser, or a halogen laser. Further, the kind of light source that may be used in the present invention is not limited to the above-mentioned types. Thus, any type may be used as long as it can accomplish the objects of the present invention. Meanwhile, the conditions of the UV rays required in the spot irradiation are not particularly limited. For example, UV rays having a wavelength of 400 nm to 10 nm may be used. Further, the UV rays used in the above-mentioned step may have an illumination intensity of 200 mW/cm$^2$ to 1,000 mW/cm$^2$. In addition, the UV rays used in the above-mentioned step may have a radiation intensity of 50 mJ/cm$^2$ to 1,500 mJ/cm$^2$. However, the characteristics of the UV rays such as illumination or radiation intensity are not particularly limited, and thus may be appropriately controlled in consideration of, for instance, the desired storage modulus of the pattern to be formed.

In the case where the pattern of hard and soft areas is to be realized using a UV cutoff mask, the second step may include irradiating UV rays on the coating solution coated on the substrate through the UV cutoff mask.

Figure 2:
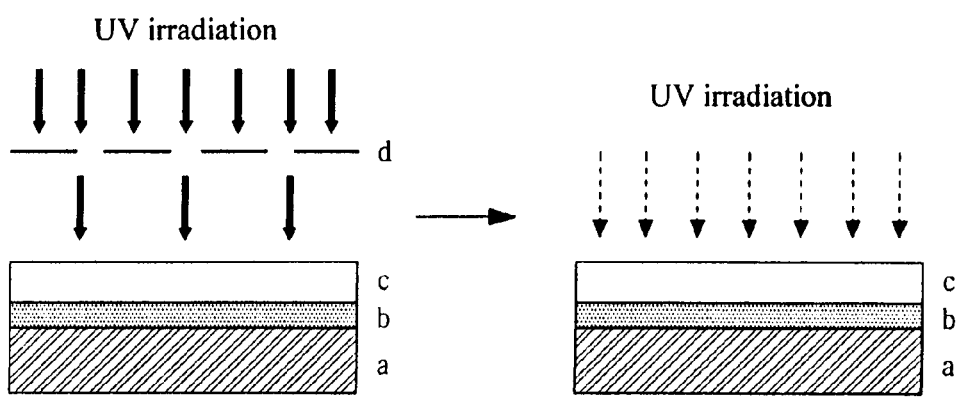
FIGS. 2 and 3 are schematic views illustrating a process of producing a pressure-sensitive adhesive according to exemplary embodiments of the present invention.

FIG. 2 is a schematic view illustrating a pattern forming method according to an embodiment of the present invention, and particularly a process of stacking a transparent releasable film c on a coating solution b formed on a substrate a (e.g. a polarizer or a releasable film) and then irradiating UV rays through a UV cutoff mask d.

Here, the "UV cutoff mask" may be made of a material which is capable of cutting off the UV rays, i.e. which is capable of preventing transmission of the UV rays. In the present invention, the material of the UV cutoff mask is not particularly limited. For example, an ordinary material known in the art may be properly employed. In the present invention, a pattern through which the UV rays can be transmitted may be formed on the UV cutoff mask in consideration of a desired hard area pattern, and then the UV rays are irradiated through the UV cutoff mask. In this process, the UV rays are irradiated on the coating solution b formed on the substrate a along the pattern formed on the UV cutoff mask d, and thus the hardness of the coating solution of the area irradiated with the UV rays may be increased.

In the present invention, the characteristics of the irradiated UV rays are not particularly limited. For example, UV rays having a wavelength of 400 nm to 10 nm may be used. Further, the UV rays used in this step may have an illumination intensity of 200 mW/cm$^2$ to 1,000 mW/cm$^2$, and a radiation intensity of 100 mJ/cm$^2$ to 1,500 mJ/cm$^2$. However, the characteristics of the UV rays such as illumination or radiation intensity are not particularly limited, and thus may be appropriately controlled in consideration of, for instance, the storage modulus of the desired pattern to be formed.

In the present invention, when the pattern is formed using the UV cutoff mask, subsequent to the above-mentioned step (hereinafter, referred to as "step (1)"), a step (hereinafter, referred to as "step (2)") of removing the UV cutoff mask, and then irradiating the UV rays on the coating solution again may be additionally performed.

In the present invention, from the standpoint of pattern formation efficiency, it is preferable to control the UV rays irradiated in step (2) to have a weaker intensity than the UV rays irradiated in step (1). In detail, the hardness of the pattern of the hard area formed by irradiating the UV rays in step (1) is not greatly influenced by the UV rays irradiated in step (2). As such, even if the UV rays are irradiated in step (2) after the UV cutoff mask is removed, the pattern of the hard area formed in step (1) can be maintained, and another area (i.e. a soft area) where the UV rays are not irradiated in step (1) is cured by weak irradiation of UV rays, so that a pattern is formed according to the degree of curing.

Thus, in the method of the present invention, UV rays having a wavelength of 400 nm to 10 nm may be used in step (2), and the illumination thereof may be controlled within a range of 200 mW/cm$^2$ to 1,000 mW/cm$^2$. The radiation intensity of the UV rays may be controlled within a range of 400 mJ/cm$^2$ or less. However, the characteristics of the UV rays such as illumination or radiation intensity are not particularly limited, and thus may be appropriately controlled in consideration of, for instance, the desired storage modulus of the pattern to be formed.

However, the conditions of the irradiated UV rays are merely illustrative of the present invention. In other words, in the present invention, the conditions of the irradiated UV rays may be freely varied in consideration of the pattern to be formed, and the pattern may be formed through only step (1) without performing step (2) in the above-mentioned method according to circumstances.

Further, in the present invention, when the pattern of hard and soft areas are to be realized using the UV shield mask, the second step may include irradiating the UV rays on the coating solution coated on the substrate through the UV shield mask.

Figure 3:
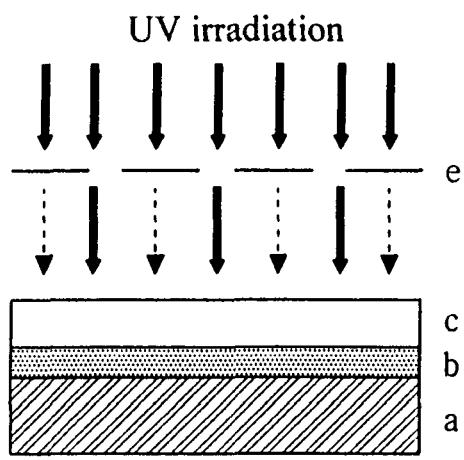

FIG. 3 is a schematic view illustrating a pattern forming method according to another embodiment of the present invention, and particularly a process of forming a transparent releasable film c on a coating solution b formed on a substrate a (e.g. a polarizer or a releasable film) and then irradiating UV rays through a UV shield mask e.

The term "UV shield mask" as used in the present invention refers to a mask made of a material having a shielding rate with respect to UV rays of about 40 to 95%, and preferably about 50 to 90%. In the present invention, the material of the UV shield mask is not particularly limited. For example, an ordinary material known in the art may be properly employed. As illustrated in FIG. 3, when a predetermined pattern is formed on the UV shield mask, and then UV rays are irradiated through the UV shield mask, the UV rays are transmitted at full intensity through a portion where the pattern is formed, and thus strong UV rays are irradiated. In contrast, only some of the irradiated UV rays are transmitted through a portion where the pattern is not formed, and thus weak UV rays are irradiated. Thus, an area in which the UV rays are strongly irradiated has high hardness, whereas an area in which the UV rays are weakly irradiated has low hardness. As a result, the pattern of hard and soft areas may be formed. Further, in this step, when the UV irradiation conditions (e.g. irradiating dose and/or time) or the shielding rate of the UV shield mask are properly controlled, the desired pattern may be efficiently formed.

In the present invention, when the pattern is formed using the UV shield mask, UV rays having a wavelength of 10 nm to 400 nm may be used. Further, the UV rays in this step may have illumination intensity of 200 mW/cm$^2$ to 1,000 mW/cm$^2$. In addition, the UV rays in this step may have a radiation intensity of 200 mJ/cm$^2$ to 1,500 mJ/cm$^2$. However, the characteristics of the UV rays such as illumination or radiation intensity are not particularly limited, and may be appropriately controlled in consideration of, for instance, the desired storage modulus of the pattern to be formed.

However, the UV irradiation conditions are merely illustrative of the present invention. In other words, in the present invention, the UV irradiation conditions may be freely varied in consideration of the desired pattern or the shield rate of the UV shield mask.

In the present invention, subsequent to each of the above-mentioned steps, a process of, for instance, transferring the pressure-sensitive adhesive formed on a releasable substrate to the polarizer may be properly performed as needed.

Further, the present invention relates to a polarizer including the pressure-sensitive adhesive of the present invention, the pressure-sensitive being formed on one or both surfaces of a polarizing film or element.

In the present invention, the type of polarizing film or element making up the polarizer is not particularly limited. For example, the polarizing film or element may be a film prepared by incorporating a polarizing component such as iodine or dichromatic dye into a polyvinylalcohol resin film, and elongating the film. Examples of the polyvinylalcohol resin that may be used herein include, but are not limited to, polyvinylalcohol, polyvinyl formal, polyvinylacetal, or hydrolysate of an ethylene vinyl acetate copolymer. In the present invention, the thickness of the polarizing film or element is not particularly limited, and thus it is formed at a typical thickness.

Further, the polarizer may have a multilayer structure in which a protecting film is formed on one surface or both surfaces of the polarizing film or element. Examples of the protecting film include, but are not limited to, a cellulose film such as triacetyl cellulose (TAC), a polycarbonate film, a polyester film such as a polyethylene terephthalate film, a polyethersulfone film and/or a polyolefin film such as polyethylene film, a polypropylene film, or a polyolefin film having a cyclo or norbornene structure. In the present invention, the thickness of the protecting film is not particularly limited, and thus it may be formed at a typical thickness.

The polarizer of the present invention may further include at least one functional layer selected from the group consisting of a protective layer, a reflective layer, an anti-glare layer, a phase differential plate, a wide viewing-angle compensating film, and a brightness improving film, in addition to the protecting film formed on the polarizing film or element.

In the present invention, when the pressure-sensitive adhesive is formed on the polarizer as mentioned above, it is preferable to set the direction where the hard and soft areas of the pressure-sensitive adhesive are formed in consideration of the direction that the polarizing film or element is elongated. This is because the polarizing film or element included in the polarizer is elongated in one direction in the process of preparation in order to produce a polarization property, and thus the polarizer suffers from reduction in dimensional stability, particularly in the direction of elongation.

Figure 4:
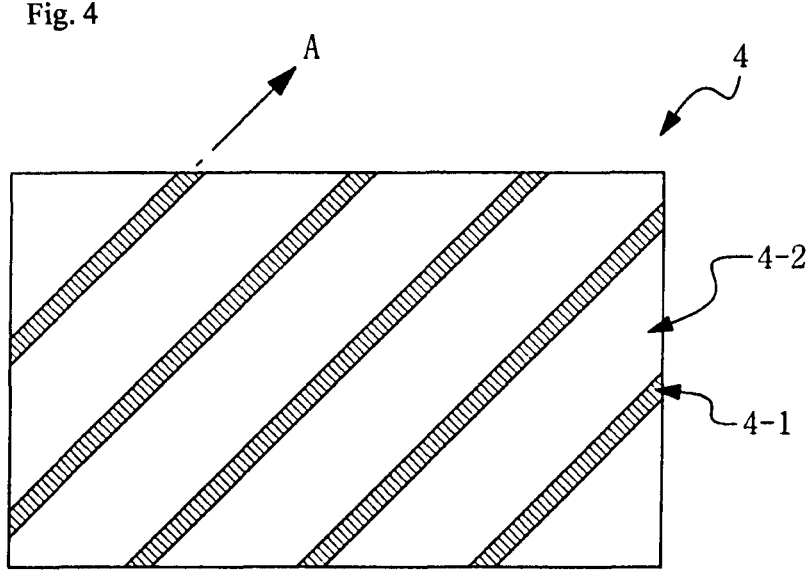
FIGS. 4 through 9 are schematic plan views illustrating a pressure-sensitive adhesive according to exemplary embodiments of the present invention.
Figure 5:
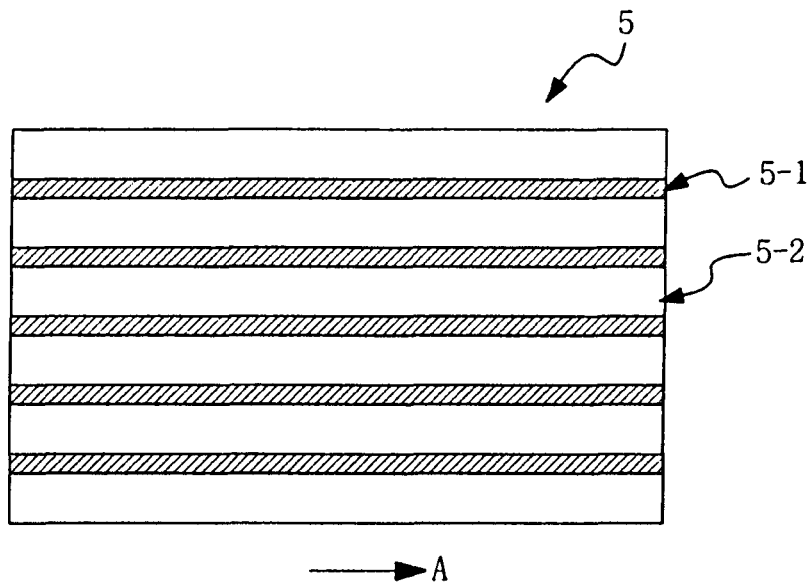

Thus, for example, as illustrated in FIG. 4 or 5, the hard areas 4-1 or 5-1 is formed on the pressure-sensitive adhesive 4 or 5 in the shape of a continuous line, and the linear hard area 4-1 or 5-1 is formed parallel to the direction of elongation A of the polarizing film or element. The linear hard areas 4-1 or 5-1 formed on the pressure-sensitive adhesive 4 or 5 may effectively inhibit a dimensional change caused by shrinkage or expansion of the polarizer.

In detail, the polarizer of the present invention may include the polarizing film or element, and the pressure-sensitive adhesive formed on one or both surfaces of the polarizing film or element, and the hard area of the pressure-sensitive adhesive may be patterned in the shape of a line, preferably a continuous line, and the linear hard area may be formed parallel to the direction of elongation of the polarizing film or element.

Figure 6:
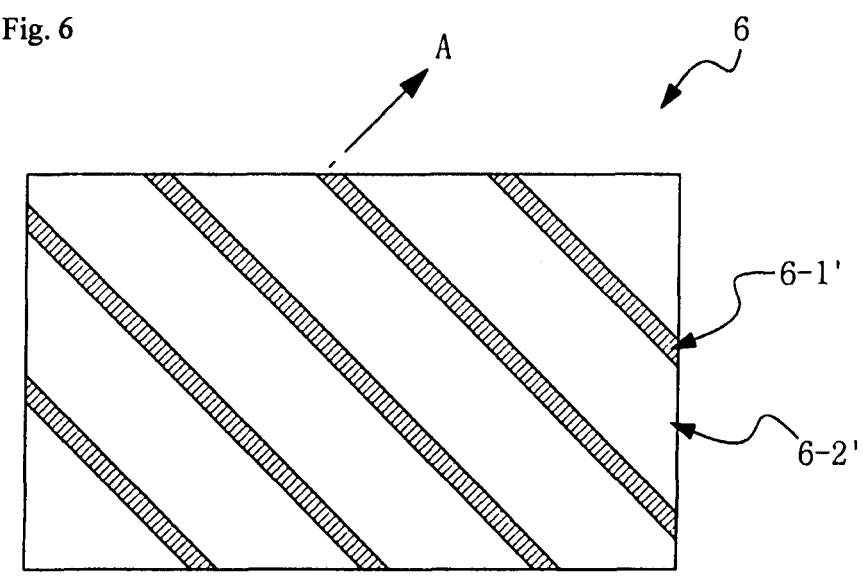
Figure 7:
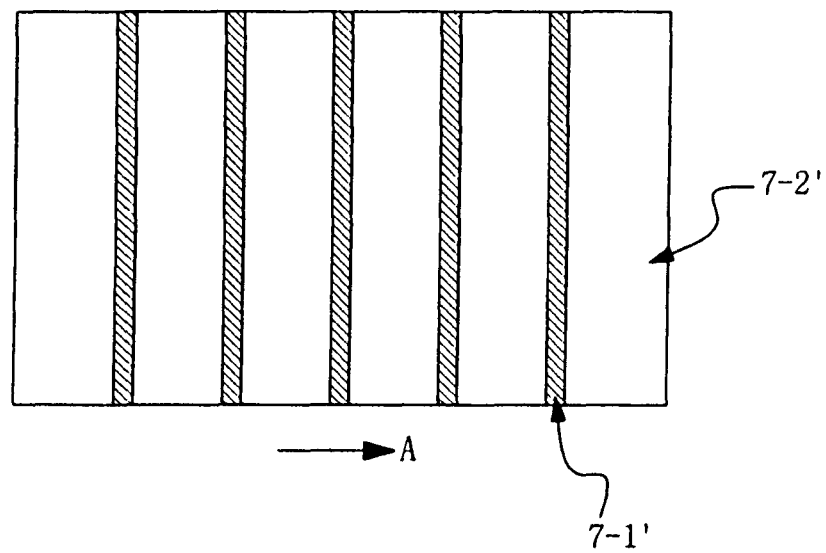
Figure 8:
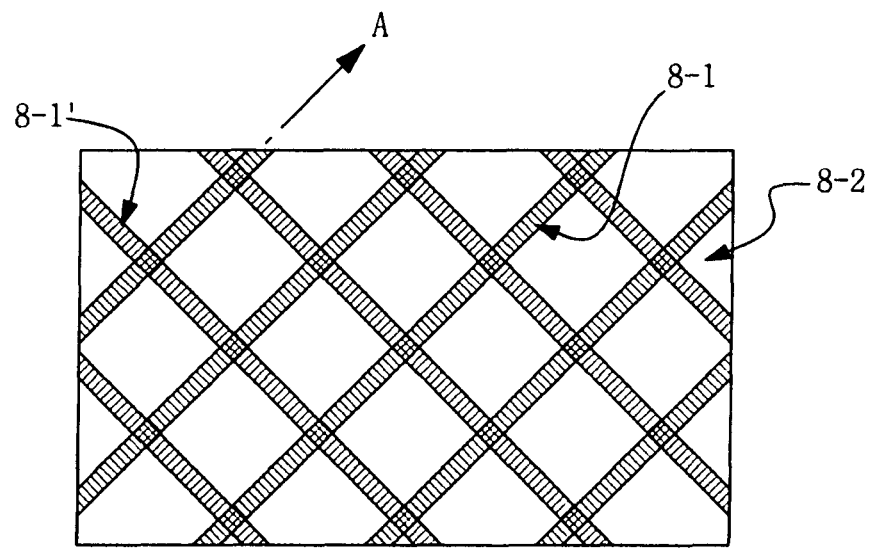
Figure 9:
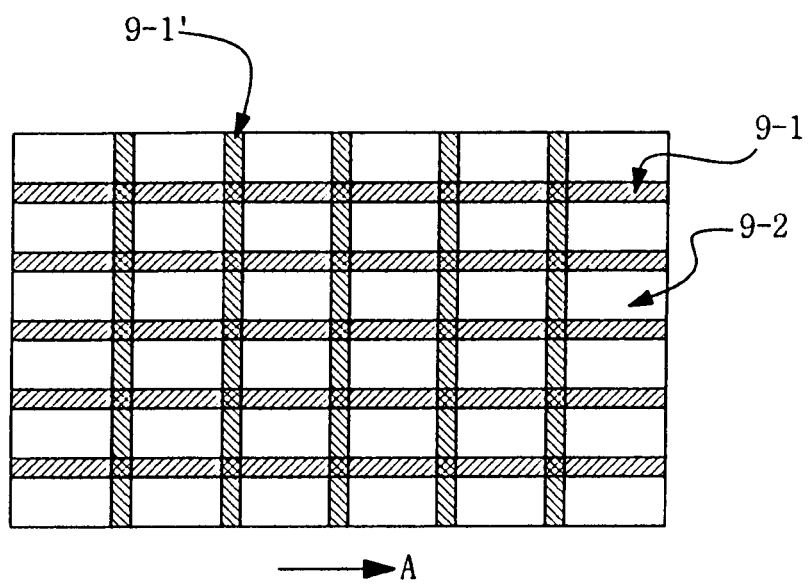

Further, in the present invention, as illustrated in FIG. 6 or 7, the hard areas 6-1' or 7-1' of the pressure-sensitive adhesive 6 or 7 included in the polarizer may be patterned in the shape of a line perpendicular to the direction of elongation A of the polarizing film or element. If necessary, in order to maximize an effect obtained by forming the pattern of the hard area, as illustrated in FIG. 8 or 9, the pressure-sensitive adhesive 8 or 9 of the present invention may include both the linear hard areas 8-1 or 9-1 formed in a direction parallel to the direction of elongation A of the polarizing film or element and the linear hard areas 8-1' or 9-1' formed in a direction perpendicular to the direction of elongation A of the polarizing film or element.

In detail, the polarizer of the present invention may include the polarizing film or element, and the pressure-sensitive adhesive formed on one or both surfaces of the polarizing film or element, and the hard area of the pressure-sensitive adhesive may be patterned in the shape of a line, preferably a continuous line, and the linear hard area may be formed perpendicular to the direction of elongation of the polarizing film or element.

The present invention also relates to a liquid crystal display (LCD) including a liquid crystal panel in which the polarizer of the present invention is attached to one or both surfaces of a liquid crystal cell.

The type of liquid crystal panel included in the LCD of the present invention is not particularly limited. For example, the liquid crystal panel may employ all types of known liquid crystal panels, which include a passive matrix type such as a twisted nematic (TN) type, a super twisted nematic (STN) type, a ferroelectric (F) type, or a polymer dispersed (PD) LCD type, an active matrix type such as a two terminal type and a three terminal type, an in-plane switching (IPS) type, and a vertical alignment (VA) type. Further, the other components included in the LCD and their manufacturing methods are not particularly limited, and thus may be used by adopting a typical configuration of the related art with no limitation.

EXAMPLES

Hereinafter, the present invention will be described in greater detail with reference to the following examples and comparative examples, but the scope thereof is not restricted to these examples.

Preparation Example 1

Preparation of Acryl Resin A 100 parts by weight of n-butyl acrylate (n-BA) was added to a 1 L reactor in which nitrogen gas was refluxed, and which had a cooler for adjustment of temperature installed. Then, 120 parts by weight of ethyl acetate (EAc) was added as a solvent, and then the reactor was purged with nitrogen gas for 60 minutes in order to remove oxygen. After that, the reactor was kept at a temperature of 60° C., and 0.05 parts by weight of azobisisobutyronitrile (AIBN) were added as a reaction initiator, and reacted for 8 hours. After the reaction was completed, the reacted product was diluted with EAc (solid content: about 15 wt %). Thereby, an acryl resin A having a weight-average molecular weight of 1,850,000 and a molecular weight distribution Mw/Mn of 5.5 was prepared.

Preparation Example 2

Preparation of Acryl Resin B

An acryl resin B having a weight-average molecular weight of 1,910,000 and Mw/Mn of 4.9 was prepared through the same process as in Example 1, except that a monomer mixture including 99 parts by weight of n-butyl acrylate (n-BA) and 1 part by weight of 2-hydroxyethyl acrylate was used.

Preparation Example 3

Preparation of Pressure-Sensitive Adhesive Composition (Coating Solution) C

Relative to 100 parts by weight of the acryl resin A, 15 parts by weight of tris(acryloxyethyl)isocyanurate (trifunctional type, M315) as a multi-functional acrylate, and 1.0 part by weight of hydroxyl cyclohexyl phenyl ketone (Irg 184, available from Ciba Specialty Chemical Corp., Switzerland) as a photo initiator were mixed. Thereby, a pressure-sensitive adhesive composition C was prepared.

Preparation Example 4

Preparation of Pressure-Sensitive Adhesive Composition (Coating Solution) D

Relative to 100 parts by weight of the acryl resin B, 0.5 parts by weight of TDI isocyanate crosslinking agent (Coronate L, Nippon Polyurethane Co. Ltd., Japan) as a multifunctional crosslinking agent, 15 parts by weight of tris(acryloxyethyl)isocyanurate (tri functional type, M315) as multifunctional acrylate, and 1.0 part by weight of hydroxyl cyclohexyl phenyl ketone (Irg 184, available from Ciba Specialty Chemical Corp., Switzerland) as a photo initiator were mixed. Thereby, a pressure-sensitive adhesive composition D was prepared.

Examples 1 Through 7 and Comparative Examples 1 and 2

As shown in Table 1 below, a pressure-sensitive adhesive where hard and soft areas were patterned was prepared using the pressure-sensitive adhesive composition prepared in Preparation Example 3 or 4. Here, the patterns of the hard and soft areas were formed using a UV cutoff mask or a UV shield mask. The corresponding method will be described below in detail. In the case of Comparative Example 2, uniform UV rays were irradiated on the entire surface of a coating solution, thereby adjusting the storage modulus. No step for forming the patterns was taken.

Use of UV Cutoff Mask (Method A)

The formation of the pattern using the UV cutoff mask was carried out according to the method shown in FIG. 2. In detail, the pressure-sensitive adhesive composition prepared in each Preparation Example was coated on a transparent releasable film c (PET film, MRF-38, available from Mitsubishi Polyester Film Co. Ltd.) having a thickness of 38 μm (to have a thickness of 23 μm after being dried), and was then dried in an oven at 110° C. for 3 minutes. Subsequently, the dried coating layer b was attached to a polarizer a, and then UV rays were irradiated from the side of the releasable film c through the UV cutoff mask d having a pattern.

The UV cutoff mask d was brought into contact with the releasable film c to the utmost extent, thereby minimizing a gap between the releasable film c and the UV cutoff mask d. The pattern of the UV cutoff mask d was formed in the shape of a line parallel to the direction of elongation of the polarizing film as illustrated in FIG. 4, or was formed in two directions, which were parallel and perpendicular to the direction of elongation as illustrated in FIG. 8. The width of the pattern was set to about 100 μm.

Further, the UV rays were first irradiated through the UV cutoff mask d (primary irradiation), and then irradiated again after the UV cutoff mask d was removed (secondary irradiation). In this case, the UV rays were irradiated with an illumination intensity of 600 mW/cm$^2$ while only the radiation intensity was varied as follows.

Primary Irradiation of UV Rays
 UV Irradiator: high-pressure mercury lamp
 Illumination intensity: 600 mW/cm$^2$
 Radiation intensity: 200 mJ/cm$^2$, 400 mJ/cm$^2$, 800 mJ/cm$^2$, and 1,200 mJ/cm$^2$ Secondary Irradiation of UV Rays
 UV Irradiator: high-pressure mercury lamp
 Illumination intensity: 600 mW/cm$^2$
 Radiation intensity: 100 mJ/cm$^2$, 200 mJ/cm$^2$, and 400 mJ/cm$^2$ Use of UV Shield Mask (Method B)

The formation of the pattern using the UV cutoff mask was carried out according to the method shown in FIG. 3. In detail, the pressure-sensitive adhesive composition prepared in each Preparation Example was coated on a transparent releasable film c (PET film, MRF-38, available from Mitsubishi Polyester Film Co. Ltd.) having a thickness of 38 μm (to have a thickness of 23 μm after being dried), and was then dried in an oven at 110° C. for 3 minutes. Subsequently, the dried coating layer b was attached to a polarizer a, and then UV rays were irradiated from the side of the releasable film c through the UV shield mask e having a pattern.

The UV cutoff mask d was brought into contact with the releasable film c to the utmost extent, thereby minimizing a gap between the releasable film c and the UV shield mask e. The pattern of the UV shield mask e was formed in the shape of a line parallel to the direction of elongation of the polarizing film as illustrated in FIG. 4, or was formed in two directions parallel and perpendicular to the direction of elongation as illustrated in FIG. 8. The width of the pattern was set to about 100 μm. A UV shielding rate of portions where the pattern was not formed was set to about 87.5%. When the UV shield mask e was used, the UV irradiation conditions were as follows.

UV Irradiation Conditions
 UV Irradiator: high-pressure mercury lamp
 Illumination intensity: 600 mW/cm$^2$
 Radiation intensity: 800 mJ/cm$^2$

TABLE 1

|  | Example | | | | | | | Comparative Example | |
| --- | --- | --- | --- | --- | --- | --- | --- | --- | --- |
|  | 1 | 2 | 3 | 4 | 5 | 6 | 7 | 1 | 2 |
| Pressure-sensitive adhesive Composition | C | C | C | C | C | C | D | D | C |
| UV Irradiation method | A | A | A | A | A | B | A | — | — |
| Mask Type | FIG. 4 | FIG. 4 | FIG. 4 | FIG. 4 | FIG. 8 | FIG. 4 | FIG. 4 | — | — |
| UV radiation intensity Primary | 800 | 1,200 | 400 | 800 | 800 | 800 | 800 | — | 800 |
| UV radiation intensity Secondary | 200 | 200 | 100 | — | 200 | 200 | 200 | — | — |

With respect to the pressure-sensitive adhesive or the polarizer prepared in each of the Examples and Comparative Examples, the physical properties thereof such as gel fraction, adhesion, removability, durability and reliability, light transmission uniformity, storage modulus, etc. were measured.

1. Measurement of Gel Fraction

The prepared pressure-sensitive adhesive was left in a constant temperature and humidity chamber (23° C. and 60% of relative humidity (R.H.)) for about 7 days, and then about 0.3 g of the adhesive was sampled, and put into a stainless wire netting of 200 meshes. Then, the pressure-sensitive adhesive was deposited in EAc, and was stored in a room-temperature darkroom for 3 days (72 hours). After that, the wire netting was taken out. Undissolved parts of the adhesive were separated, and dried in an oven at 70° C. for 4 hours, and the weight (i.e. the weight of the dried undissolved parts) thereof was measured. Then, the gel fraction thereof was measured using Equation 1 below.

$$\text{Gel Content} = B/A \times 100 \qquad \text{[Equation 1]}$$

where A represents the weight (0.3 g) of the pressure-sensitive adhesive before it was deposited in EAc, and B represents the weight of the dried undissolved parts after being deposited in EAc.

2. Evaluation of Adhesion and Removability

The prepared polarizer was cut to a size of 25 mm (width)× 100 mm (length), and thereby a sample was prepared. A releasable film was removed from the sample, and the sample was attached to alkali-free glass via the pressure-sensitive adhesive using a laminator. Subsequently, the sample was compressed in an autoclave (at 50° C. and 5 atm) for about 20 minutes, and stored for 24 hours under constant temperature and humidity conditions (23° C. and 50% R.H.). Thereby, a specimen was prepared. After that, the adhesion strength of the specimen was measured under conditions of a peeling speed of 300 mm/min and a peeling angle of 180° using a texture analyzer (Stable Micro System Ltd., England). Thereby, the removability was evaluated according to the following criteria.

◯: when the adhesion strength after 1 day was 800 gf/25 mm or less.

Δ: when the adhesion strength after 1 day was 1,000 gf/25 mm or more.

x: when the adhesion strength after 1 day was 2,000 gf/25 mm or more.

3. Evaluation of Durability and Reliability

The prepared polarizer was cut to a size of 180 mm (width)×250 mm (length), and thereby a sample was prepared. A releasable film was removed from the sample, and the sample was attached to a 19-inch commercial panel using a laminator. Subsequently, the sample was compressed in an autoclave (at 50° C. and 5 atm) for about 20 minutes, and stored for 24 hours under constant temperature and humidity conditions (23° C. and 50% R.H.). Thereby, a specimen was prepared. After that, in order to evaluate humidity and heat-resistant durability of the prepared specimen, the specimen was left under conditions of 60° C. and 90% R.H. for 500 hours, and then it was evaluated as to whether or not bubbles appeared or peeling occurred (humidity and heat-resistant conditions). Further, to evaluate heat-resistant durability, the specimens were left at 90° C. and 105° C. for 500 hours, and then it was evaluated as to whether or not the bubbles appeared or peeling occurred (heat-resistant conditions). All the specimens were evaluated after being left at room temperature for 24 hours just before their states were evaluated.

The criteria for evaluating the humidity and heat-resistant characteristics and the heat-resistant characteristics were as follows.

◯: when neither the bubbles nor the peeling occurred.

Δ: when the bubbles and/or the peeling occurred slightly.

x: when the bubbles and/or the peeling occurred considerably.

4. Light Transmission Uniformity

The light transmission uniformity was evaluated by observing whether or not there was a portion where light leaks out through a polarizer in a darkroom using a backlight. In detail, a polarizer having the pressure-sensitive adhesive layer was attached to a 22-inch monitor (available from LG Philips LCD Co. Ltd.), and it was stored under constant temperature and humidity conditions for 1 day and left in an oven at 80° C. for 200 hours. Then, the light transmission uniformity of circumferences of four edges of the monitor was evaluated using the backlight. The criteria for evaluating the light transmission uniformity were as follows.

⊙: when the light transmission uniformity in the circumferences of the four edges of the monitor was hardly observed with the naked eye.

◯: when the light transmission uniformity in the circumferences of the four edges of the monitor was slightly observed with the naked eye.

Δ: when the light transmission uniformity in the circumferences of the four edges of the monitor was somewhat observed with the naked eye.

x: when the light transmission uniformity in the circumferences of the four edges of the monitor was considerably observed with the naked eye.

6. Measurement of Storage Modulus of Adhesive

The pressure-sensitive adhesive coated between releasable films was cut to a size of 15 cm×25 cm, and one of the releasable films was removed. Then, the pressure-sensitive adhesive was laminated five times until the thickness thereof was about 1 mm. Subsequently, the laminate was cut in the shape of a circle having a diameter of 8 mm, compressed by glass, and left overnight to increase wettability on an interface between the respective layers as well as remove bubbles generated during lamination. Thereby, a specimen was prepared. Next, the specimen was placed on a parallel plate, and a gap was adjusted. Then, the storage modulus was measured after zero points of normal and torque were adjusted, and stabilization of a normal force was checked.

Measurement Apparatus and Conditions

Measurement apparatus: ARES-RDA having a forced convection oven, available from TA Instruments Inc.

Measurement Conditions:

1) geometry: 8 mm parallel plate
2) gap: about 1 mm
3) test type: dynamic strain frequency sweep
4) strain: 10.0%,
5) temperature: 30 t
6) initial frequency: 0.4 rad/s, and
7) final frequency: 100 rad/s.

The results of the measurement as mentioned above are arranged in Table 2.

TABLE 2

|  | Example | | | | | | | Comparative Example | |
|---|---|---|---|---|---|---|---|---|---|
|  | 1 | 2 | 3 | 4 | 5 | 6 | 7 | 1 | 2 |
| $G'_{hard}$ (MPa) | 10.1 | 42.5 | 6.6 | 10.1 | 10.1 | 10.1 | 10.1 | 0.30 | 10.1 |
| $G'_{soft}$ (MPa) | 1.3 | 1.3 | 0.8 | 0.11 | 1.3 | 1.3 | 1.3 | 0.30 | 10.1 |

TABLE 2-continued

|  | Example | | | | | | | Comparative Example | |
| --- | --- | --- | --- | --- | --- | --- | --- | --- | --- |
|  | 1 | 2 | 3 | 4 | 5 | 6 | 7 | 1 | 2 |
| RG' | 7.8 | 32.7 | 8.3 | 91.8 | 7.8 | 7.8 | 7.8 | 1 | 1 |
| HP area (%) | 30 | 20 | 40 | 50 | 40 | 30 | 30 | 0 | 0 |
| Gel Content (%) | 93 | 94 | 94 | 61 | 95 | 92 | 92 | 81 | 95 |
| Adhesion (gf/25 mm) | 340 | 250 | 270 | 390 | 305 | 330 | 220 | 750 | 120 |
| Removability | ○ | ○ | ○ | ○ | ○ | ○ | ○ | ○ | ○ |
| Heat-resistant Durability 90° C. | ○ | ○ | ○ | ○ | ○ | ○ | ○ | Δ | Δ |
| Heat-resistant Durability 105° C. | ○ | ○ | ○ | ○ | ○ | ○ | ○ | X | X |
| Humidity and Heat-resistant Durability | ○ | ○ | ○ | ○ | ○ | ○ | ○ | X | X |
| Light Transmission Uniformity | ⊙ | ⊙ | ⊙ | ⊙ | ⊙ | ⊙ | ⊙ | X | ○ |

$G'_{hard}$: storage modulus of hard area
$G'_{soft}$: storage modulus of soft area
RG': ratio of storage moduli of hard and soft areas ($G'_{hard}/G'_{soft}$)
HP area: proportion of hard area with respect to entire area of adhesive As can be seen from the results of Table 2, Examples 1 through 7 of the present invention in which the pattern of hard and soft areas was formed in the single pressure-sensitive adhesive show excellent durability and reliability under high-temperature or high-humidity conditions, and maintain excellent physical properties such as adhesion and removability. Further, when applied to a monitor having a large size of 22 inches, Examples 1 through 7 of the present invention showed excellent light transmission uniformity.

In contrast, in the case of Comparative Example 1 in which the storage modulus of the entire surface of the pressure-sensitive adhesive was relatively low, the shrinkage and expansion caused by the strain of the polarizer was not effectively inhibited, so that the light leakage was widely distributed, and the durability and reliability was very weak. Further, in the case of Comparative Example 2 in which the storage modulus of the entire surface of the pressure-sensitive adhesive was relatively high, the hardness of the pressure-sensitive adhesive was increased, so that the pressure-sensitive adhesive did not produce sufficient adhesion strength, and the durability thereof was greatly reduced.

It can be confirmed from the above-mentioned results that, in the state where the storage modulus of the entire surface of the pressure-sensitive adhesive is equally controlled, the pressure-sensitive adhesive cannot easily produce an excellent effect even through adjustment of the storage modulus.

The pressure-sensitive adhesive of the present invention has excellent durability and reliability under high-temperature or high-humidity conditions as well as excellent physical properties such as tackiness, removability and workability. Further, the pressure-sensitive adhesive of the present invention represents high stability with respect to strain caused by the shrinkage and expansion of the polarizing element when applied to, for instance, a polarizer, so that light leakage can be effectively prevented when the pressure-sensitive adhesive is applied to a large-sized display. Thus, the present invention provides a pressure-sensitive adhesive having excellent durability and reliability, tackiness, workability, removability, and of the ability to inhibit light leakage under high-temperature or high-humidity conditions, a method of producing the pressure-sensitive adhesive, a polarizer having the pressure-sensitive adhesive, and a liquid crystal display having the polarizer.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A polarizer including a pressure-sensitive adhesive on one or both surfaces of a polarizing film or a polarizing element,
wherein the pressure-sensitive adhesive comprises a hard area and a soft area having a lower storage modulus than the hard area, the hard area and the soft area being patterned within a single plane.

2. The polarizer according to claim 1, wherein the hard area has a storage modulus ranging from 1 MPa to 50 MPa at 30° C.

3. The polarizer according to claim 1, wherein the soft area has a storage modulus ranging from 0.01 MPa to 5.0 MPa at 30° C.

4. The polarizer according to claim 1, wherein the hard area is patterned in the shape of a line.

5. The polarizer according to claim 4, wherein the hard area is patterned in the shape of a continuous line.

6. The polarizer according to claim 4, wherein the hard area patterned in the shape of a line has a width of 90 μm to 1,000 μm.

7. The polarizer according to claim 1, wherein the ratio ($G'_{hard}/G'_{soft}$) of the storage modulus ($G'_{hard}$) of the hard area to the storage modulus ($G'_{soft}$) of the soft area is 3 to 100.

8. The polarizer according to claim 1, wherein the hard area occupies an area of 10% to 60%, relative to the entire area of the pressure-sensitive adhesive.

9. The polarizer according to claim 1, wherein the pressure-sensitive adhesive has a gel content of 50% to 99%, the gel content being expressed by equation 1 below:

$$\text{Gel Content} = B/A \times 100 \quad \text{[Equation 1]}$$

where A represents the weight of the pressure-sensitive adhesive, and B represents the weight of the undissloved parts of the pressure-sensitive adhesive, the weight of the undissloved parts being measured after depositing the pressure-sensitive adhesive in ethyl acetate for 72 hours at room temperature, and drying the deposits.

10. The polarizer according to claim 1, wherein the pressure-sensitive adhesive includes an interpenetrating polymer network.

11. The polarizer according to claim 1, wherein the hard area in the pressure-sensitive adhesive is patterned in the shape of a line, and the line pattern is formed parallel to the direction of elongation of the polarizing film or the polarizing element.

12. The polarizer according to claim 1, wherein the hard area in the pressure-sensitive adhesive is patterned in the shape of a line, and the line pattern is formed perpendicular to the direction of elongation of the polarizing film or the polarizing element.

13. The polarizer according to claim 1, wherein the hard area in the pressure-sensitive adhesive is patterned in a shape of a line, and the line pattern includes a pattern formed parallel to the direction of elongation of the polarizing film or the polarizing element and a pattern formed perpendicular to the direction of elongation.

14. A liquid crystal display comprising a liquid crystal panel, in which the polarizer according to claim 1 is attached on one or both surfaces of a liquid crystal cell.

* * * * *